United States Patent [19]

Reed

[11] 4,132,480
[45] Jan. 2, 1979

[54] PHOTOGRAPHIC MASK STRUCTURE

[76] Inventor: Robert A. Reed, 1484 S. Ward St., Lakewood, Colo. 80228

[21] Appl. No.: 812,553

[22] Filed: Jul. 5, 1977

[51] Int. Cl.² ............................................. G03B 27/62
[52] U.S. Cl. ................................... 355/75; 40/158 B; 353/120; 354/292; 355/126
[58] Field of Search ......................... 355/125, 126, 75; 40/158 B, 158 R; 353/120; 354/292, 296, 347

[56] References Cited

U.S. PATENT DOCUMENTS

| 1,535,142 | 4/1925 | Watson et al. | 355/125 |
| 2,534,961 | 12/1950 | Dunn | 355/126 |
| 3,202,071 | 8/1965 | Carlson | 355/125 |

Primary Examiner—Richard A. Wintercorn
Attorney, Agent, or Firm—O'Rourke and Harris

[57] ABSTRACT

A photograhic cropping mask of a planar sheet, such as paper, plastic or cardboard, having defined therein a plurality of prescored, detachable rectilinear openings having a common center, indexing means and, optionally, an area of adhesive material and/or crop marks such that the sheet may be placed adjacent a transparent film to determine the cropping opening appropriate to the film image, the selected opening produced by detaching along an appropriate score line, the film attached by means of tape or the optional adhesive area to the sheet with the film properly aligned with the opening, and the film and sheet then accurately positioned in a photographic printing apparatus by the indexing means.

9 Claims, 5 Drawing Figures

PHOTOGRAPHIC MASK STRUCTURE

BACKGROUND OF THE INVENTION

1. Field of the Invention

The present invention relates generally to a photographic cropping mask, and more particularly to such a mask having a plurality of scored, removable sections to provide, selectively, a plurality of openings having a common center which may be detached and further providing for indexing means on the mask. Optionally, an adhesive area and/or crop marks may also be provided.

2. Description of the Prior Art

It is quite common to forward transparent photographic film having images thereon, and particularly color photographic negatives, to processing and printing laboratories for the production of prints. Generally, the original exposure is not composed in an entirely satisfactory manner. Thus it is necessary to crop, or mask, around the desired portion of the transparent film in order that a properly composed print may be produced. Also, it is generally desired that the cropping be of a size commensurate with certain accepted dimensions.

In many instances, the cropping was accomplished by printers or operators at the laboratory. This of course was remote from the outlet at which the negative was originally deposited, required a substantial degree of skill on the part of the operator, and prevented the photographer or other individual desiring the prints from directly partaking in the cropping operation. On the other hand, most outlets dealing with the public are unable to reasonably and economically provide cropping masks for all the various combinations and permutations involved.

A number of cropping arrangements are known and have been suggested by the prior art. One classical approach is the use of substantially "L" shaped openings which are movable on a common diagonal to provide a varying shaped opening. U.S. Pat. Nos. 2,246,920; 3,203,334; and 3,709,591 are examples of such masking devices. These devices permit cropping of a print corresponding to the film of concern. The opening is adjusted to a desired size the opening properly oriented on the print, and the appropriate area of the print physically marked. The marked print is then forwarded to the processing laboratory with the film. Finally, the operator attempts to duplicate the cropped area on the marked print when making a print. Clearly such masking devices are too involved to economically be attached to a negative at a service outlet.

U.S. Pat. No. 2,534,961 describes an arrangement in which the results of the devices having "L" shaped movable openings are accomplished on a card structure. In this instance, a central opening is provided. A plurality of scored, removable "L" sections are provided which may be selectively detached to enlarge the opening. However, this approach provides selectable openings having differing centers as result of the arrangement of the detachable portions only on one side of the original opening. In essence, two sides of the original opening are maintained but elongated while the other two sides are replaced. As will be appreciated with the benefit of hindsight in view of the disclosure of the instant invention, the provision of selectable openings with varying centers is entirely inappropriate for cropping devices including an indexing feature. Thus, it appears clear that the masking structure of U.S. Pat. No. 2,534,961 in effect duplicates the function of the above-discussed teachings of the movable "L" shaped arrangements.

Various other masking arrangement are also known. In many, such as in U.S. Pat. No. 3,202,071, a single aperture is scored for removal but initially provided to aid in aligning the mask with the work. Other arrangements, such as in U.S. Pat. Nos. 2,187,381 and 2,381,831, are also known to the art.

Accordingly, an object of the present invention is to provide a new and improved photographic masking structure in which selectable, enlargable openings may be formed by detaching along pre-scored sections and in which the resulting openings maintain a constant orientation relative to indexing means on the masking structure.

Another object of the present invention is to provide a new improved photographic masking structure suitable for use by the photographer to orient and crop transparent film prior to forwarding of the film to a processing and printing lab.

Yet another object of the present invention is to provide a new and improved photographic masking structure which is compatable with and usable by a processing lab without involving cropping judgement and other such skills by the printers.

Still another object of the present invention is to provide a new and improved photographic masking structure which requires but one or two such structures to provide for the majority of the standard masking openings.

Still yet another object of the present invention is to provide a new and improved photographic masking structure which permits both initial orientation and masking decisions by the photographer and attachment of the transparent film to the masking structure for forwarding to a processing and printing lab.

These and other objects and features of the present invention will be apparent from the following description.

DETAILED DESCRIPTION OF THE INVENTION

Figure 1:
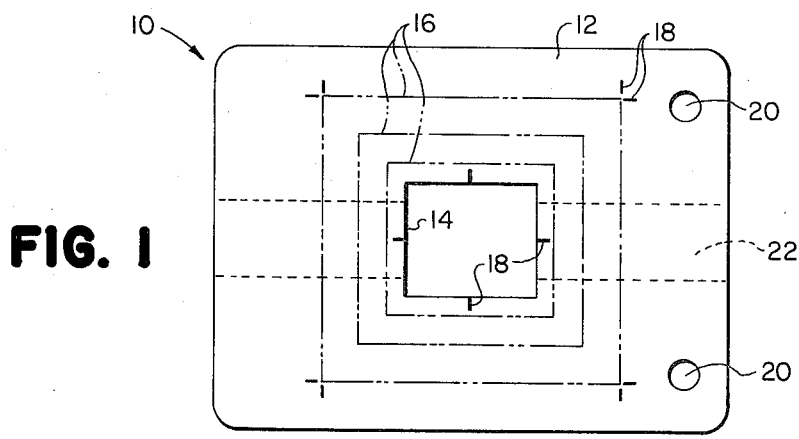
FIG. 1 is a somewhat simplified plan view of a photographic masking structure in accord with the present invention.

With reference to the drawings, wherein like components are designated by like reference numerals throughout the various figures, a photographic masking structure is illustrated in FIG. 1 and generally designated by the reference numeral 10. More specifically, masking structure 10 is formed of a planar card 12, which may be formed of heavy paper, cardboard, plastic sheet, or other such light weight material. A central opening 14 is defined in card 12, though optionally, the card need have no initial opening. For convenience, a smaller opening at the lower end of the cropping size range is provided by initial opening 14. A plurality of score line 16 preferably substantially defining a plurality of rectilinear shapes having a common center are defined in card 12. Score lines 16 are such that card 12 may be readily severed along each score line 16 to form neatly defined rectilinear, or other shaped, openings.

Optionally, cropping marks 18 may be provided at appropriate locations on the face of card 12 to facilitate orientation of a transparent film relative to the various available incipient openings. Index openings 20 are defined in card 12 in such a manner that any of the various available openings resulting from detachment along score line 16 maintain a common center orientation relative to index openings 20.

Optionally, an adhesive area 22 may be provided on one side of card 12. If so provided, adhesive area 22 is of such a material that a transparent film may be attached thereto without damaging the transparent film when removed. Adhesives having substantial securing power, but less than the securing force required to remove the film emulsion from the support, are known in the art.

Figure 2:
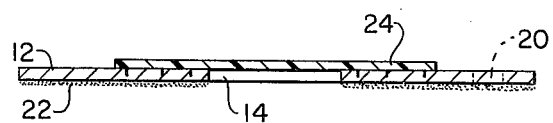
FIG. 2 is a side view in section of the structure of FIG. 1 illustrating initial orientation of a transparent film.
Figure 3:
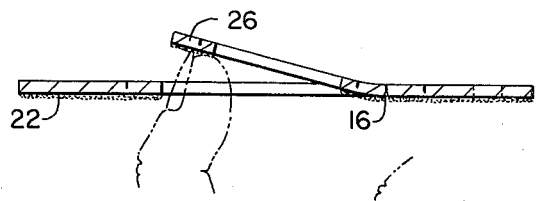
FIG. 3 is a view similar to FIG. 2 in which the selected cropping opening is formed by detaching along score lines.
Figure 4:
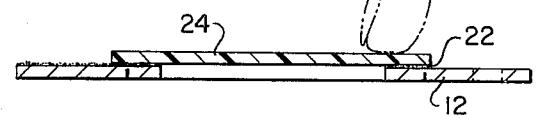
FIG. 4 is a view similar to FIG. 2 in which the transparent film is attached to the selected opening in the desired orientation.

Use of masking structure 10 to orient and crop a transparent film will be more readily understood with reference to FIGS. 2 through 4. As shown in FIG. 2, a transparent film which would normally be a negative but may also be a positive transparency, is positioned adjacent card 12. With reference to score lines 16 and crop marks 18, the transparent film is positioned on the side of card 12 opposite than that having adhesive area 22 and oriented relative to a selected opening such that the image of transparent film 24 is cropped and positioned in accord with the photographer's desire. Then, as shown in FIG. 3, a discard portion 26 is removed from card 12 along the appropriate score line 16 to provide the selected cropping opening. Though after transparent film 24 is positioned on the side of card 12, as in FIG. 4, having adhesive area 22, if any, transparent film 24 is secured to card 12 by means of adhesive 22. If optional adhesive area 22 is omitted, transparent film 24 may be conveniently secured by means of tape extending over transparent film 24 and card 12.

It is to be understood that the steps shown in FIG. 2 through 4 are accomplished at, in most instances, a retail outlet by the photographer. Thus the photographer properly crops and orients his transparent film 24 relative to photographic masking structure 10. Thereafter, card 12 and, transparent film 24, in the integral arrangement shown in FIG. 4, are forwarded to a processing and printing laboratory.

Figure 5:
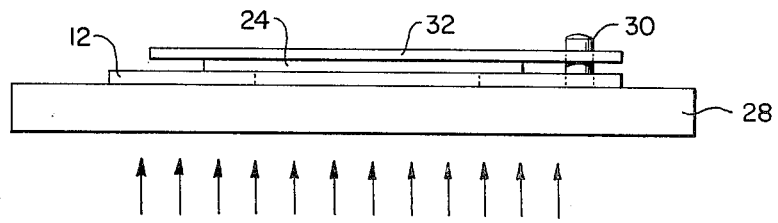
FIG. 5 is a side view of a simplified contact printing arragement utilizing the masking structure of FIGS. 1 through 4.

As shown in the simplified structure of FIG. 5, printing may be accomplished through a simple contact exposure arrangement. Card 12 is positioned on transparent support 28 by means of indexing pins 30 on transparent support 28 extending through index opening 20 of card 17. A photo-sensitive paper 32 is also positioned thereon. Thus when actinic radiation, indicated by the arrows, is directed through transparent support 28 and transparent film 24 at the area of the opening in card 12 and on to photosensitive paper 32, the image area of transparent film 24 positioned at the opening of card 12 is formed image wise on photosensitive paper 32.

A similar result is accomplished in the instance of use enlargement or reduction projectors (not shown). Card 12 is positioned, by means of index openings 20, in the desired orientation in the projection head of a projector (not shown). Normally, the printer would have to selectively position transparent film 24 in the projection head to provide an appropriately oriented image in the projection plane. However, by using photographic masking device 10, all of such judgements and decisions have been made for the printer by the photographer. Thus the printer merely positions card 12 by means of index openings 20 on orientation means analogous to indexing pins 30 of FIG. 5. This greatly speeds up the printing operation, obviates the need for highly skilled operators, and permits the photographer to make the artistic decision rather than abdicating such decisions to a remote printing machine operator.

Summarily, the photographic masking structure of the instant invention permits one or two cards having a plurality of score lines to cover the standard range of cropping openings. With the one or two cards in stock, retail outlets may permit a photographer to choose the opening, orient the transparent film relative to the opening, punch out along the scored lines the appropriate opening and, finally, attach the transparent film to the card with the cropping desired by the photographer. Thereafter, the card and transparent film is forwarded to a processing and printing laboratory. At the laboratory, the operator need only position the card by means of complementary index means on the card and which ever printing apparatus is employed to print the desired image on the film with orientation and cropping completely in accord with the photographer's desires. A critical feature in accomplishing these ends is the common center of all the available score line defined opening relative to the index mean.

Although only limited embodiments of the present invention have been illustrated and described, it is anticipated that various changes and modifications will be apparent to those skilled in the art, and that such changes and modifications may be made within the scope of the following claims.

What is claimed is:

1. A photographic mask structure comprising, a card having defined therein a plurality of incipient apertures delineated by score lines partially severing the card, with the apertures having a common center of area, and indexing means positioned on the card in a portion thereof outside of the score lines, whereby any of the incipient apertures may be formed into an opening of a selected size by detaching along the corresponding score lines and such selected openings will be oriented properly relative to the indexing means.

2. A photographic mask structure as set forth in claim 1 in which the card is formed of a paper material.

3. A photographic mask structure as set forth in claim 1 in which the indexing means comprise at least two indexing openings defined adjacent an edge of the card.

4. A photographic mask structure as set forth in claim 1 in which a central opening is defined within the incipient apertures and has a common center of area with the incipient apertures.

5. A photographic mask structure as set forth in claim 1 in which at least a portion of the planar card carries thereon an adhesive area.

6. A photographic mask structure as set forth in claim 1 in which cropping marks appear on at least one surface of the card.

7. A cropping mask for photographic transparent film comprising, a card in sheet form of a paper board material having defined therein a plurality of score lines in the form of subtantially concentric, rectilinear configurations having a common center of area, and indexing means defined in the card at a position spaced from the confines of the score lines.

8. A cropping mask as set forth in claim 7 in which at least a portion of one side of the card carries thereon an adhesive area.

9. A cropping mask as set forth in claim 7 in which the indexing means comprise at least two spaced subtantially circular openings defined in the card.

* * * * *